US007712041B2

(12) United States Patent
Toyama et al.

(10) Patent No.: US 7,712,041 B2
(45) Date of Patent: May 4, 2010

(54) MULTI-USER MULTI-INPUT DESKTOP WORKSPACES AND APPLICATIONS

(75) Inventors: Kentaro Toyama, Sadashivnagar (IN); Bhrighu Sareen, Redmond, WA (US); Bradley L Carpenter, Carnation, WA (US); Udai Singh Pawar, Bangalore (IN)

(73) Assignee: Microsoft Corporation, Redmond, WA (US)

( * ) Notice: Subject to any disclaimer, the term of this patent is extended or adjusted under 35 U.S.C. 154(b) by 753 days.

(21) Appl. No.: 11/465,392

(22) Filed: Aug. 17, 2006

(65) Prior Publication Data

US 2007/0294632 A1 Dec. 20, 2007

(51) Int. Cl.
*G06F 3/048* (2006.01)
*G06F 3/00* (2006.01)

(52) U.S. Cl. ........................... 715/778; 715/751
(58) Field of Classification Search .................. 715/778, 715/751
See application file for complete search history.

(56) References Cited

U.S. PATENT DOCUMENTS

| 5,694,150 | A | 12/1997 | Sigona et al. |
| 6,326,978 | B1* | 12/2001 | Robbins .................... 345/654 |
| 6,453,328 | B1 | 9/2002 | Schaeffer et al. |
| 6,529,905 | B1 | 3/2003 | Bray et al. |
| 6,639,606 | B1 | 10/2003 | Choi |
| 6,844,865 | B2* | 1/2005 | Stasko ........................ 345/1.3 |
| 2002/0016788 | A1 | 2/2002 | Burridge |
| 2005/0010892 | A1 | 1/2005 | McNair et al. |
| 2005/0066202 | A1* | 3/2005 | Evans et al. ................. 713/202 |
| 2005/0100316 | A1 | 5/2005 | Miller et al. |
| 2005/0120103 | A1 | 6/2005 | Godin |
| 2005/0138566 | A1 | 6/2005 | Muller et al. |
| 2005/0257145 | A1 | 11/2005 | Gage |
| 2006/0005163 | A1* | 1/2006 | Huesken et al. ............. 717/107 |
| 2006/0026235 | A1* | 2/2006 | Schwarz et al. ............. 709/205 |
| 2007/0239828 | A1* | 10/2007 | Patton et al. ................ 709/204 |

OTHER PUBLICATIONS

Inkpen et al., "Shared Environments to Support Face-to-Face Collaboration" Available at, http://www.edgelab.ca/ CSCW/Workshop2000/shared_environments.html.
Inkpen, et al., "This is Fun! We're All Best Friends and We're All Playing.": Supporting Children's Synchronous Collaboration, Available at http://www.cs.sfu.ca/people/Faculty/inkpen/Papers/CSCL99/cscl99_inkpen.html.
Light, "Interesting Interfaces: Multi-Touch Input" Available at, http://www.usabilitynews.com/news/article2997.asp.
Ryall, "Multi-user Input for Tabletop Environments: Who is Touching Where, When", Available at http://pages.cpsc.ucalgary.ca/~sdscott/cscw/cscw2002/kathy_ryall.pdf.
Tse, et al., "Rapidly Prototyping Single Display Groupware through the SDGToolkit" Available at http://protal.acm.org/citation.cfm?id=976323.

\* cited by examiner

*Primary Examiner*—Rachna S Desai
*Assistant Examiner*—Soumya Dasgupta
(74) *Attorney, Agent, or Firm*—Lee & Hayes, PLLC

(57) ABSTRACT

Multi-user multi-input desktop workspaces and applications are described. In one aspect, a single computing device presents multiple workspaces on a desktop area. The desktop area is designed for multiple users to provide in parallel inputs. Each workspace is configured for use by a particular set of users. Responsive to user direction, user access restrictions to a particular workspace of the multiple workspaces is suspended to allow a new user to interface within context of a particular workspace.

19 Claims, 4 Drawing Sheets

MULTI-USER MULTI-INPUT DESKTOP WORKSPACES AND APPLICATIONS

RELATED APPLICATIONS

This application claims priority to pending India Patent Application serial no. 1454/DEL/2006, which was filed with the Government of India Patent Office on Jun. 20, 2006, and which is hereby incorporated by reference.

BACKGROUND

In developing nations, emerging markets, small-businesses, etc., a single computer is often shared amongst multiple users. In such scenarios, significant juggling may be necessary to share the computer's resources such as a set of input devices (e.g., a keyboard and a pointing device) to interface with application(s) presented on a single display. When a single computer's resources are shared across multiple users, they are typically shared by minimizing and/or maximizing applications without changing user session parameters. It can be appreciated that using such techniques to divide-up resources of a single computing device across multiple users can be inefficient, prone to user error, insecure, and suboptimal in many other ways.

SUMMARY

Systems and methods for multi-user multi-input desktop workspaces and applications are described. In one aspect, a single computing device presents multiple workspaces on a desktop area. The desktop area is designed for multiple users to provide in parallel inputs. Each workspace is configured for use by a particular set of users. Responsive to user direction, user access restrictions to a particular workspace of the multiple workspaces is suspended to allow a new user to interface within context of a particular workspace.

This Summary is provided to introduce a selection of concepts in a simplified form that are further described below in the detailed description. This Summary is not intended to identify key features or essential features of the claimed subject matter, nor is it intended to be used as an aid in determining the scope of the claimed subject matter.

BRIEF DESCRIPTION OF THE DRAWINGS

In the Figures, the left-most digit of a component reference number identifies the particular Figure in which the component first appears.

DETAILED DESCRIPTION

An Exemplary System

Although not required, systems and methods for multi-user multi-input desktop workspaces and applications are described in the general context of computer-executable instructions executed by a computing device such as a personal computer. Program modules generally include routines, programs, objects, components, data structures, etc., that perform particular tasks or implement particular abstract data types. While the systems and methods are described in the foregoing context, acts and operations described hereinafter may also be implemented in hardware.

Figure 1:
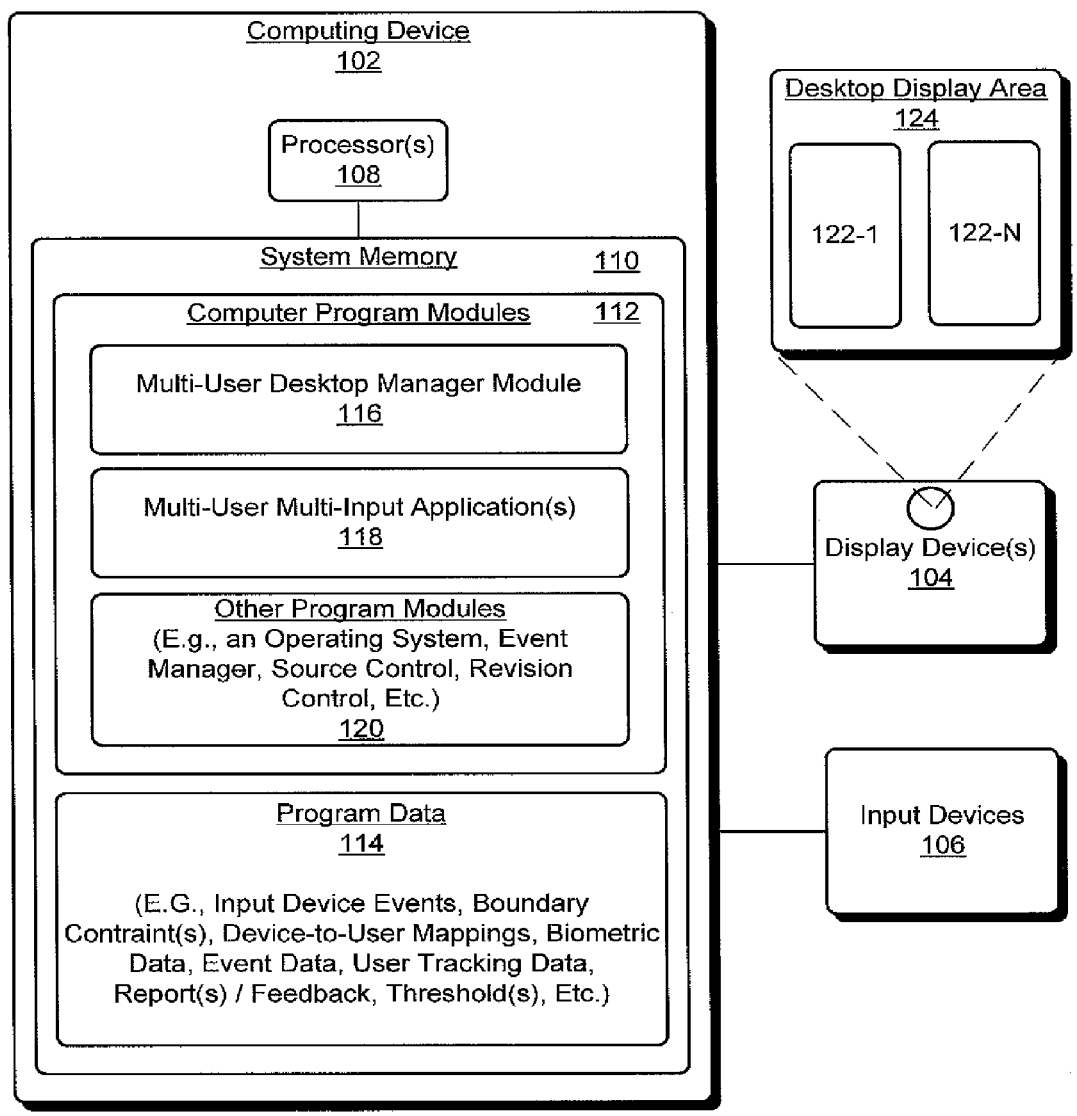
FIG. 1 shows an exemplary system for multi-user multi-input desktop workspaces and applications, according to one embodiment.

FIG. 1 shows an exemplary system 100 for multi-user multi-input desktop workspaces and applications, according to one embodiment. System 100 includes, for example, a computing device 102 coupled to display device(s) 104 and multiple input devices 106. Computing device 102 represents any type of computing device such as a general purpose computing device, a server, a laptop, a mobile computing device, etc. Display device 104 represents, for example, a monitor, an LCD, a projector, etc. Input devices 106 include, for example, any combination of pointing device(s) such as one or more mice, pen(s), keyboard(s), joystick(s), microphone(s), speaker(s), and/or so on. Input devices 106 are directly and/or wirelessly coupled to computing device 102.

Computing device 102 includes one or more processors 108 coupled to system memory 110. The system memory 110 includes computer-readable storage media having computer-readable instructions that can be executed by the processors 108. System memory 110 includes volatile memory (e.g., RAM) and non-volatile memory (e.g., ROM, Flash, hard disk, optical, etc.). System memory 110 includes computer program modules 112 and program data 114. Processor(s) 108 fetch and execute program instructions from respective ones of the computer program modules 112. Program modules 112 include, for example, multi-user desktop manager module 116 ("desktop manager 116"), multi-user multi-input application(s) 118, and "other program modules" 120 such as one or more instances of an operating system to provide a runtime environment, device drivers, other applications, etc.

Desktop manager 116 assigns/matches each user of computing device 102 to a respective set of input devices 106 (e.g., a pointing device and keyboard) for any combination of in-parallel input and serial (differential) input into computing device 102. To this end, and in one implementation, each input device 106 is assigned a unique input device identifier. Each respective user of system 100 is then mapped (assigned) to a particular input device 106. Input device-to-user mappings can be made in many different manners. In one implementation, for example, an administrator assigns a particular input device 106 to a particular user or group of users. In another implementation, an operating system or desktop manager 116 prompts user(s) to input a respective name, alias, or other unique user identifier while using a particular input device 106. That identifier is them mapped to the particular input device 106.

In another implementation, for example, desktop manager 116 (or some other application) receives biometric data from input devices 106. Biometric data includes, for example, fingerprints, voiceprints, historical cursor control or input device 106 movement patterns, etc. Biometric data (or movement patterns) received from an input device 106 corresponds to a specific user of the input device 106. Desktop manager 116 compares received biometric data to archived biometric data and/or archived input device movement patterns associated with multiple possible users of application 116. For each input device 106, if there is a match between biometric data received from the input device 106 and archived data for a particular user, desktop manager 116 maps the input device 106 to the particular user. Although several examples of mapping input devices 106 to respective users of system 100 have been described, many other techniques could also be used to map respective ones of input devices 106 to respective users of system 100. For purposes of exemplary illustration, input device-to-user mappings are shown as respective portions of "other program data" 126.

To manage user input into desktop display area 124, events from input devices 106 are placed by the operating system (or event manager) into an event queue. Such events correspond to user actions, for example, such as selecting, moving, resizing, inputting text, and/or otherwise interfacing with a UI object or window presented in context of desktop display area 118. Each event includes a certain amount of information, for example, such as an indication of the particular input device 106 that generated the event, an event type (e.g., mouse move events, selection events, etc.), and event type specific data. Event type specific data includes, for example, on-screen cursor positional coordinates, an indication of whether a user performed one or multiple clicks to generate the event, an indication of the UI window associated with the event, and/or so on. The operating system (or event manager) sends these input device events to the window associated with the event for processing.

In one implementation, desktop manager 116, responsive to receipt of user input, and/or responsive to detecting a certain number of users interfacing with input device(s) 106, instantiates a respective instance of the operating system through known virtualization techniques to provide each user with a respective workspace 122 for user(s) within desktop display area 124. In this implementation, a respective operating system provides the runtime environment for a particular one workspace 122, and a different instance of the operating system provides the runtime environment for a different workspace 122. In another implementation, only a single operating system is used to provide a respective workspace 122 for user(s) within desktop display area 124. In this latter implementation, desktop manager 116, or another application executing on computing device 102, manages user interaction such as input/output (I/O), application instantiation, etc., with for each respective workspace 122. In one implementation, each workspace represents a respective remote desktop protocol session.

In one implementation, each user is associated with a single respective workspace 122, and each user can interface with only their respective workspace 122. In another implementation more than one user can interface with a particular workspace 122. As described below, a user associated with a particular workspace 122 can configure the workspace 122 for use by other user(s). In one implementation, a user defines a workspace 122 for use by at least the user, by dragging out a selection area on desktop display area 124 (this is illustrated in reference to FIG. 2). In one implementation, when a user defines more than one workspace 122, adjacent workspaces 122 are merged into a single workspace 122. In another implementation, desktop manager 116 automatically splits desktop display area 124 into multiple independent workspaces 122 (e.g., workspaces 122-1 through 122-N) as a function of the number of user's assigned to input devices 106. For example, one workspace 122 is automatically generated for each respective user.

Each set of input device(s) 106 is associated with a particular cursor control. Using respective cursor control(s), users can interface with aspects of an associated workspace 122, and run arbitrary computer-program application(s) ("application(s)") within their selected workspace 122. At least a subset of users associated with a particular workspace 122 can independently interface with application(s) executing within context of the workspace 122. An exemplary such application is a multi-user multi-input application 118 that provides for multiple users to independently or collaboratively interface with the application using respective ones of the cursor controls associated with input devices 106. In one implementation, user input into an application is differentiated by cursor (i.e., input device 106) and/or by application. For example, an application executing within a particular workspace 122 can be configured to receive input from only a particular type of input device 106 (e.g., a keyboard or a mouse, etc) or from a particular set of user(s).

Figure 2:
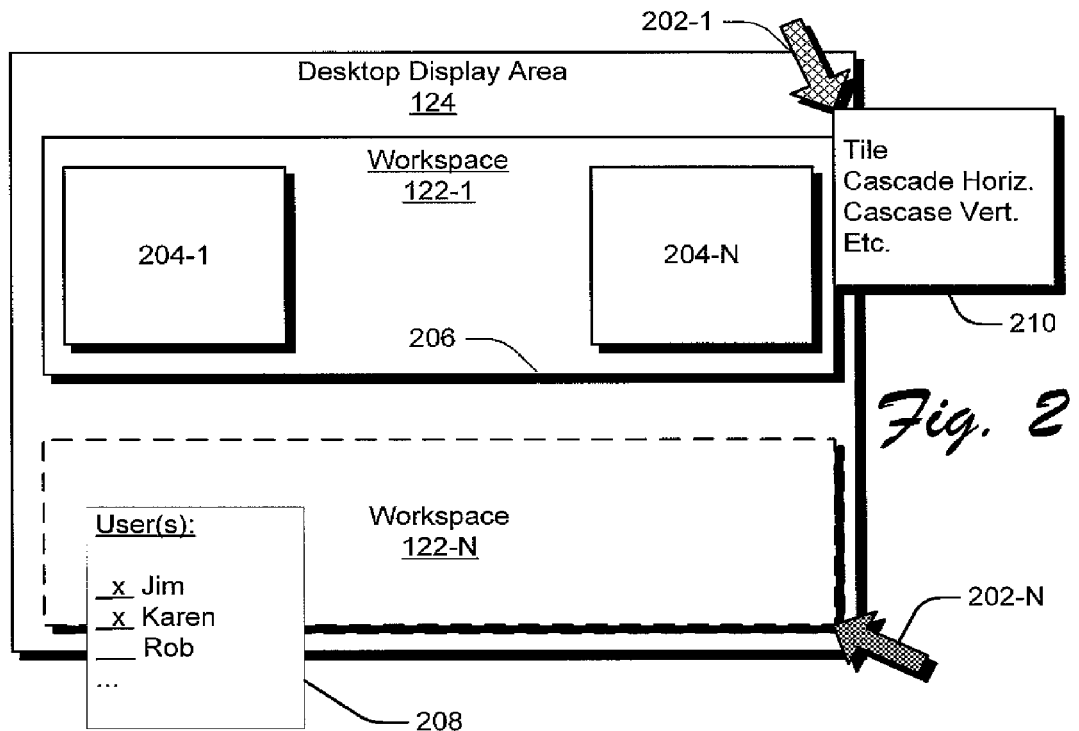
FIG. 2 shows and exemplary desktop user interface (UI) for multi-user multi-input desktop workspaces and applications, according to one embodiment.

FIG. 2 shows and exemplary desktop display area 124 for multi-user multi-input desktop workspaces and applications, according to one embodiment. In the following description of FIG. 2, each first numeral of a reference number indicates the particular drawing where the component associated with the reference number was first identified. For example, the first numeral of a workspace 122 is a "1", thus workspace 122 was first presented in FIG. 1.

Referring to the example of FIG. 2, desktop 124 is split into multiple regions or windows to define respective workspaces 122 (e.g., workspaces 122-1 through 122-N). In one implementation, desktop manager 116, responsive to receipt of user input, and/or responsive to detecting a certain number of users interfacing with input device(s) 106, provides a respective workspace 122 for user(s) within desktop display area 124. In one implementation, a user defines a particular workspace by dragging out a selection area on the desktop 124. For example, cursor 202-N is shown dragging out user workspace 122-N, which has an area delineated by a dashed line. In one implementation, each user is associated with a single respective workspace 122, and each user can interface with only their respective workspace 122. In another implementation more than one user can interface with a particular workspace 122.

In one implementation, a user resizes (adjusts) a corresponding workspace 122 by using an input device 106 to select and drag a top, left, bottom, right, or corner boundary 206 of the workspace 122. The user can resize the workspace 122 using other techniques, for example, using a dropdown menu, a dialog boxes, etc. When area of a workspace 122 is changed, desktop manager 116 adjusts the boundary of the workspace 122. In this scenario, and in one implementation, desktop manager 116 modifies relative area of other workspaces 122 based on the area of the newly resized workspace 122 and the area of desktop 124. In one implementation, desktop manager 116 constrains sizes of workspace(s) 122. For example, in one implementation, desktop manager 116 ensures that a workspace 122 will occupy at least one quarter area of desktop 124.

One or more users are associated with a workspace 122. Using a respective cursor control 202, a user associated with a workspace 122 can independently interface with any number and type of computer-program applications 204 (e.g., 204-1 through 204-N) executing within context of a particular workspace 122. (An exemplary such application 204 is shown in FIG. 1 as a multi-user multi-input application 118). In one implementation, the UI (desktop 124) is configured to allow only a single user (e.g., a user associated with cursor 202-1) to provide input into a single workspace 122 (e.g. workspace 122-1). In one implementation, multiple users can interface with a single workspace 122 (e.g. workspace 122-1). For example, drop down menu 208 allows a user initially associated with a workspace 122 to specify which of other users of desktop 124 may have access to the user's particular workspace 122.

Workspaces 122-1 and 122-N of FIG. 2 are shown in a cascaded, horizontal orientation with respect to one another.

In one implementation, desktop 124 provides means for a user to change/toggle workspace 122 orientation preference. There are many known techniques (e.g., dialog boxes, etc.) to allow a user to provide preferences such as window orientation. Any of these techniques can be used for the user to specify workspace 122 orientation. For example, in one implementation, a user selects a workspace 122 orientation preference from a drop-down menu 210.

Figure 3:
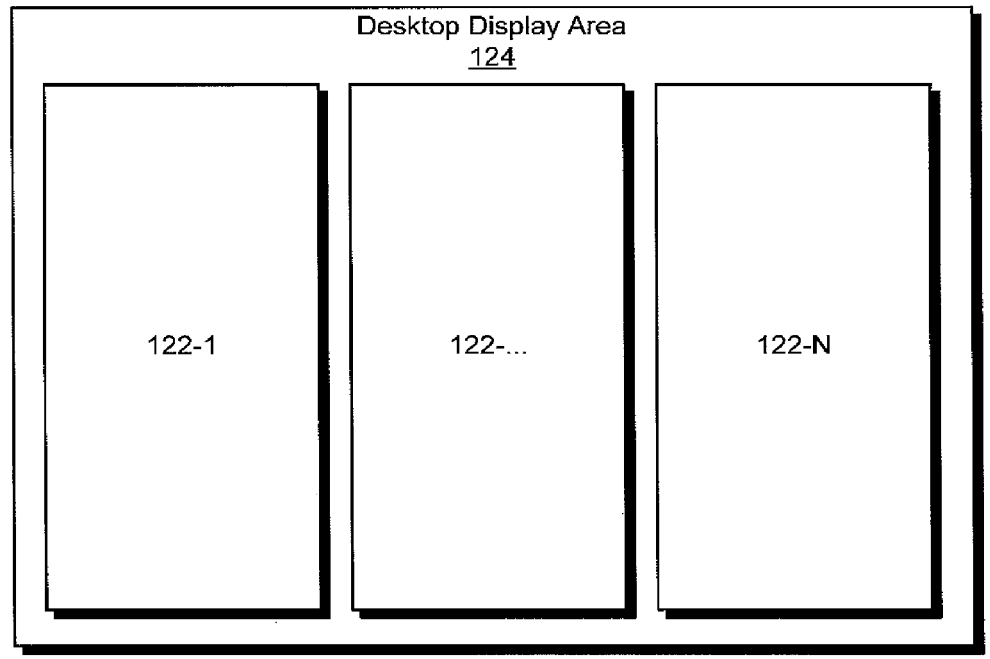
FIG. 3 shows exemplary desktop workspaces in a configurable cascaded orientation, according to one embodiment.

FIG. 3 shows exemplary workspaces 122 in a configurable cascaded vertical orientation, according to one embodiment.

Figure 4:
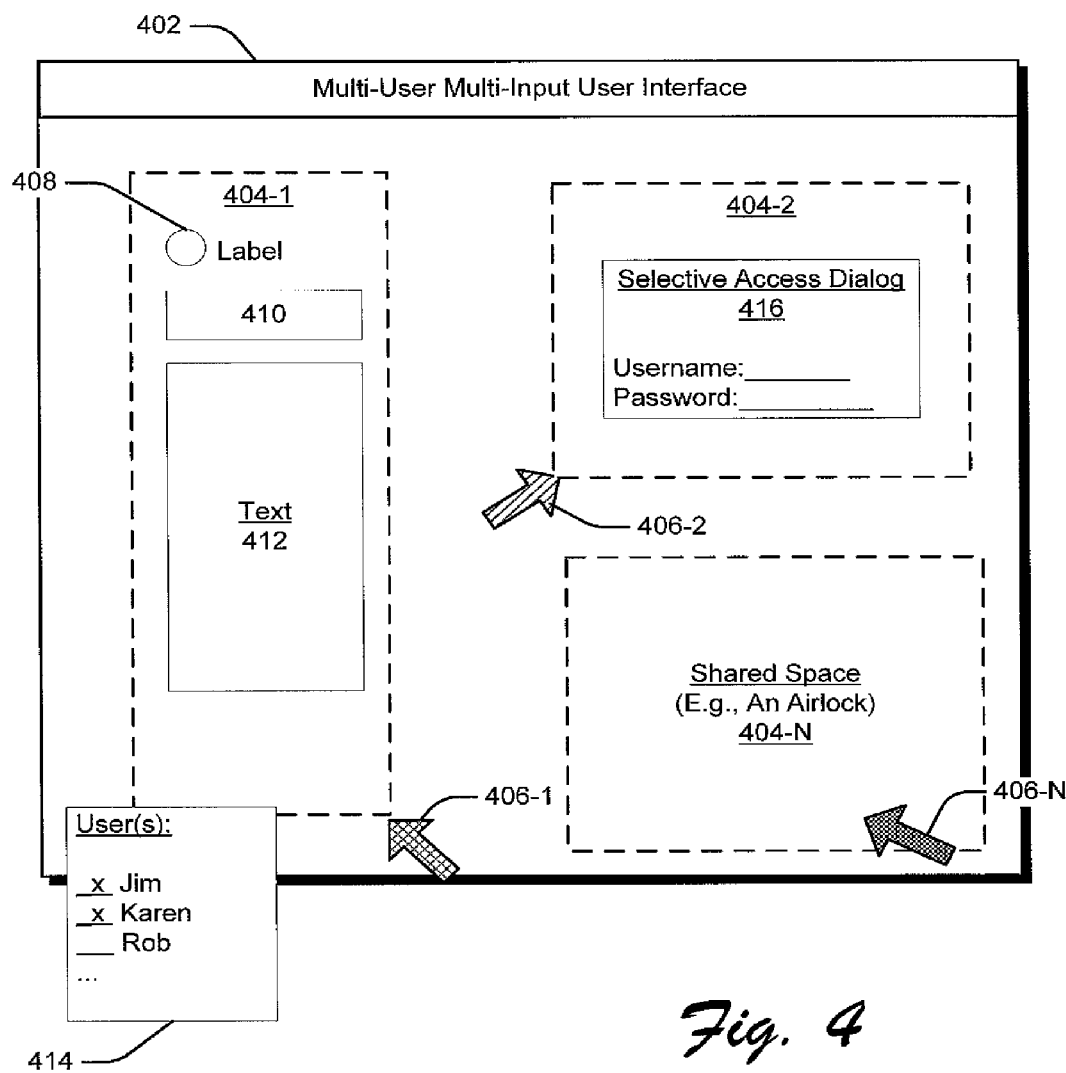
FIG. 4 shows an exemplary multi-user multi-input UI, according to one embodiment.

FIG. 4 shows an exemplary multi-user multi-input UT 402, according to one embodiment. In one implementation, UI 402 is a UI of an application executing within context of a workspace 122 on desktop 124. In another implementation, UI 402 is a desktop 124. With respect to the first implementation, wherein UI 402 is a UI of an application executing within context of a workspace 122, an exemplary such application is shown, for example, as application 204 of FIG. 2. When multiple users have access to a single workspace 122, user access to applications executing within context of that workspace 122 can be on an application-by-application basis and/or based on specified access to a subset of application functionality. For example, an application can be configured to accepts input from only a specific one user (i.e., the user is associated with a particular cursor control 406). In another example, an application is configured to accept independent (in-parallel or serial) input from multiple users.

In another example, an application is configured to allow one set of users to provide input to a specific set of UI controls associated with the application, and is also configured to allow a different set of users to provide input to a different set of UI controls associated with the application. That is, the application may determine which UI controls can be used by which user according to configurable and arbitrary application defined criteria, or a user may delineate a set of UI controls for the user to interface.

In one implementation, a user utilizes a corresponding cursor 406 to select (or drag out) an area 404 (e.g., areas 404-1 through 404-N) on the UI 402 within which the user can operate. As shown in FIG. 4, a particular user associated with cursor 406-1 drags out an area 404-1 (boundaries of the dragged-out area are shown with dashed lines). The dragged-out area 404-1 includes UI controls, for example, radio button 408, drop-down menu or scroll box 410, text input area 412, and/or so on. In one implementation, the application allows only the particular user to interface with the UI controls in the area 404-1 (i.e., only the particular user assigned to cursor 406-1 can interface with area 404-1). Analogously, in this implementation, only a user associated with cursor 406-2 can provide input into area 404-2, etc.

In one implementation, UI 402 suspends boundaries (and associated input/interfacing permissions) between respective areas 404 responsive to a user action (e.g., a key press, etc.). This suspension allows users other than the particular user that defined an area to provide input into the area (e.g., cut and paste text from one area 404 to a different area 404). In one implementation, UI 402 provides permission settings for a user to prevent or allow such boundary suspension functionality being applied to the user's particular area 404. For example, in one implementation, UI 402 provides at least a subset of areas 404 with a drop-down menu 414 for a user to specify which of other users of UI 402 may have access to (e.g., responsive to an area boundary suspension action) or control over the user's particular area(s) 404. In one implementation, UI 402 provides an independent login for at least a subset of the areas 404 that are allocated to one or more users. For example, login dialog box 416 is a selective access dialog box that allows only the user(s) of area 404-2 to log into area 404-2.

In one implementation, when a user defines more than one region or area 404, adjacent (or non-adjacent) such areas associated with the user are merged into a single area 404. Additionally, in one implementation, UI 402 allows a user to specify whether a clipboard via shared across multiple users or individual to a particular user. In one implementation, UI 402 provides a shared space (e.g., "an airlock") wherein all users can paste and copy data, interact with UI control(s) encapsulated within the shared space, and/or so on. In the example of FIG. 4, area 404-N represents such a shared space.

When UI 402 is a desktop 124, rather than an application window, each area 404-1 is a corresponding workspace 122 of FIG. 1. Users can run arbitrary applications within their selected workspace 404. In this scenario, UI controls such as UI controls 408 through 412 are presented within context of application(s) executing in the workspace 404-1. Additionally, responsive to a suspend boundaries action, user workspace boundaries are suspended for a configurable amount of time. In this scenario, or if user(s) are interfacing with the shared space 404-N, users can not only copy and paste text, images, etc., to/from respective workspaces 404 and/or to/from application(s) executing in respective workspaces 404, but users can also copy and paste application(s) executing within a first workspace 404 into a second (different) workspace 404. This is a straightforward creation of a new instance of the application in a workspace 122 and providing the new instance with a snapshot of the data configuration of the executing application. Additionally, in this scenario, UI 402 provides a selective access dialog 416 for selective log-in into respective workspaces 404.

In one implementation, UI 402 allows a user associated with a particular workspace 404 to specify other users that are allowed to utilize the particular workspace 404. For example, in one implementation, UI 402 presents a drop-down menu 414 (or some other UI control) allowing the user to specify other users with permission to work in a particular workspace.

An Exemplary Procedure

Figure 5:
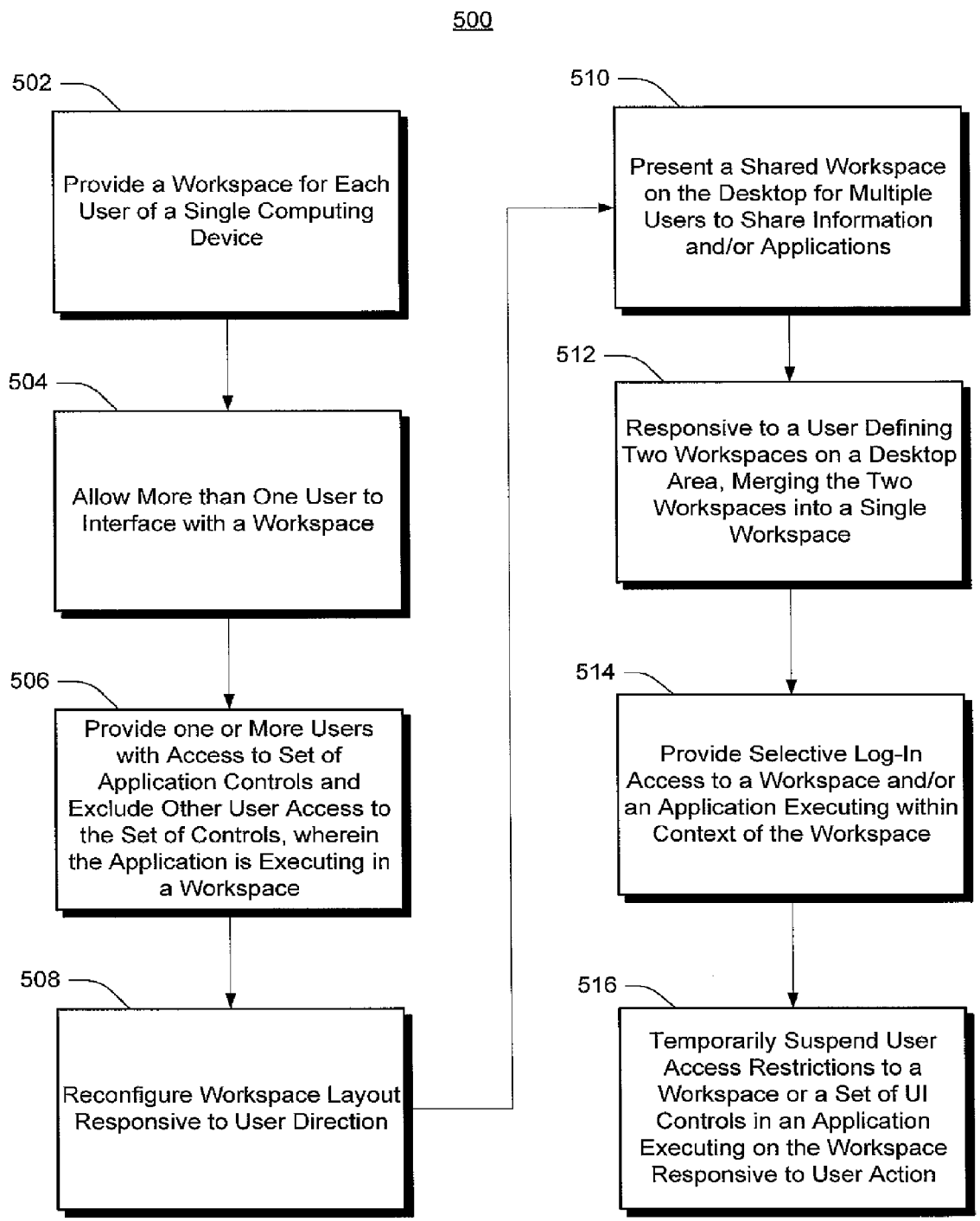
FIG. 5 shows an exemplary procedure for multi-user multi-input desktop workspaces and applications, according to one embodiment.

FIG. 5 shows an exemplary procedure 500 for multi-user multi-input desktop workspaces and applications, according to one embodiment. For purposes of exemplary illustration and description, the operations of procedure 300 are described with respect to components of FIGS. 1 through 4. In the following description of FIG. 5, each first numeral of a reference number indicates a drawing where the component associated with the reference number was first identified. For example, the first numeral of desktop manager 116 is a "1", thus desktop manager 116 is first presented in FIG. 1. Exemplary operations of procedure 500, as shown in FIG. 5, have reference numbers that start with the numeral "5".

Additionally, although the exemplary operations of procedure 500 are shown in a certain order and include a certain number of operations, the illustrated operational order and included (executed) operations can be different based on one or more of the particular implementation of procedure 500 and based on user input. For example, although blocks are presented in a particular order, operations associated with the blocks may be implemented in a different order. Additionally, in any one particular execution of the multi-input multi-user application, an entity's interaction with the application may result in a particular operation of a block not being implemented. For example, an entity (e.g., user, administrator, teacher, etc.) may not change workspace 122 orientation from horizontal to vertical or vice versa.

Referring to FIG. 5, block 502 provides a workspace 122 on a desktop 124 for each user of a single computing device 102. For example, in one implementation, desktop manager 116 presents multiple workspaces 122 on virtual desktop 124. In one implementation, a user defines initial dimensions of a corresponding workspace by specifying a selection area on the virtual desktop with a cursor control. Blocks 504 through 518 process input from one or more users assigned to one or more of the multiple workspaces. For example, block 504 allows more than one user to interface with a particular workspace 122. This can be accomplished in any number of different manners. For example, in one implementation, a drop-down menu allows a user that created a workspace 122, or a user that is otherwise initially associated with the workspace 122, to select other users of desktop 124 that can interface with the workspace 122.

Block 506 provides one or more users with access to a set of UI controls associated with an application executing in a particular workspace 122. This is accomplished in a manner that excludes such UI control access to other users of the application. For example, in one implementation, the user drags out in the area over the UI of an application to select a set of UI controls. Responsive to the selection, the application only accepts input to those UI controls from the user. Since each user is associated with a particular one cursor control (i.e., input device 106), the application accomplishes this by determining which cursor control is being used to provide the input.

Block 508 reconfigures workspace layout responsive to user direction. For example, in one implementation, a user resizes a workspace 122 by selecting and dragging a boundary 206 of the workspace 122. In this implementation, desktop manager 116 automatically changes the size of any other workspaces presented on desktop 124 based on the newly resized workspace 122. In one implementation, desktop manager 116 enforces a resize constraint to ensure that each workspace 122 retains a minimum presentation size on display area 124. In another example, operations of block 508 include changing a particular orientation of multiple workspaces 122 desktop area 124 from a horizontal orientation to a vertical orientation, or vice versa.

Block 510 presents a shared workspace 404-N on desktop area 124 for multiple users to share information and/or applications. Block 512, responsive to user defined to workspaces on a desktop area 124, merges the two workspaces 122 into a single workspace 122. In one implementation, desktop manager 116 merges any two adjacent workspaces 122 associated with a particular user. Block 514 provides selective login access to a workspace 122 and/or application executing within context of the workspace. Block 516 temporarily suspends user access restrictions to a workspace or to a set of UI controls in an application executing within context of the user workspace. In one implementation, desktop manager 116 suspends such access restrictions based on a key-press or some other action of a user interfacing within context of desktop area 124.

Conclusion

Although systems and methods for multi-user multi-input desktop workspaces and applications have been described in language specific to structural features and/or methodological operations or actions, it is understood that the implementations defined in the appended claims are not necessarily limited to the specific features or actions described above. Rather, the specific features of system 100 and operations of procedure 200 are disclosed as exemplary forms of implementing the claimed subject matter.

The invention claimed is:

1. A computer-implemented method comprising:
   providing multiple workspaces on a desktop area of a single computing device, each workspace of the multiple workspaces is accessible for use by a particular set of users of the single computing device, the desktop area being configured for in-parallel interfacing by the users, each of the users being assigned a particular set of input devices of multiple input devices to interface within context of a corresponding one or more of the multiple workspaces;
   responsive to user direction, suspending user access restrictions to a particular workspace of the multiple workspaces to allow a new user to interface within context of the particular workspace of the multiple workspaces
   executing an application within context of the particular workspace;
   receiving input from the user or the different user identifying a particular set of user interface controls associated with the application; and
   restricting access to the set of user interface controls to whichever of the user or the different user provided the input.

2. The method of claim 1, wherein the particular workspace of the multiple workspaces is a shared workspace for use by each of the users.

3. The method of claim 1, wherein providing the multiple workspaces further comprises:
   receiving input from the user indicating that the user has selected a particular portion of the desktop area;
   generating the workspace of the multiple workspaces with dimensions of the particular portion; and
   restricting access to the workspace to the user.

4. The method of claim 1, wherein providing the multiple workspaces further comprises:
   determining a number of users that are interfacing with the desktop area;
   creating a respective workspace of the multiple workspaces for each of the number of users; and
   for each workspace, restricting access to the workspace to a particular one user of the users such that each user is assigned to a particular one workspace.

5. The method of claim 1, further comprising:
   executing an application within context of the workspace of the multiple workspaces;
   receiving input from the user indicating that the user has selected a set of user interface controls associated with the application; and
   restricting access to the set of user interface controls to the user.

6. The method of claim 1, further comprising:
   providing selective log-in access to the workspace of the multiple workspaces; or
   providing selective log-in access to an application executing within context of the workspace.

7. The method of claim 1, further comprising, responsive to user direction, reconfiguring layout of at least one of the multiple workspaces.

8. The method of claim 7, wherein reconfiguring the layout further comprises changing a horizontal orientation of the multiple workspaces to a vertical orientation, or modifying the vertical orientation of the multiple workspaces to a horizontal orientation.

9. The method of claim 7, wherein the user direction comprises receiving input from an input device indicating that the user has resized the at least one workspace; and
wherein reconfiguring the layout further comprises changing dimension of the at least one workspace based on the input.

10. The method of claim 7, wherein reconfiguring the layout further comprises:
determining that the user is associated with more than one of the multiple workspaces; and
responsive to the determining, merging each workspace associated with the user into a single workspace.

11. A computer-readable storage medium comprising computer-program instructions executable by a processor that, when executed by the processor, perform operations comprising:
generating multiple workspaces on a desktop area of a single computing device;
for each workspace of the multiple workspaces, restricting access to the workspace: (a) to a user that created the workspace; and (b) to the user of multiple users determined to be interfacing with a desktop display area;
responsive to direction from user authorized to interface with a particular workspace of the multiple workspaces, providing access to the particular workspace to a different user to interface within context of the particular workspace of the multiple workspaces;
executing an application within context of the particular workspace;
receiving input from the user or the different user identifying a particular set of user interface controls associated with the application; and
restricting access to the set of user interface controls to whichever of the user or the different user provided the input.

12. A computer-readable storage medium of claim 11, wherein the particular workspace of the multiple workspaces is a shared workspace for use by each of the users.

13. A computer-readable storage medium of claim 11, wherein the computer-program instructions for generating further comprising instructions for:
receiving input from the user indicating that the user has selected a particular portion of the desktop area; and
generating the workspace of the multiple workspaces with dimensions of the particular portion.

14. A computer-readable storage medium of claim 11, wherein the computer-program instructions for generating further comprising instructions for:
determining a number of users that are interfacing with the desktop area; and
creating a respective workspace of the multiple workspaces for each of the number of users.

15. A computer-readable storage medium of claim 11, further comprising computer-program instructions for
providing selective log-in access to a workspace of the multiple workspaces; or
providing selective log-in access to an application executing within context of the workspace.

16. A computer-readable storage medium of claim 11, further comprising, responsive to user direction, computer-program instructions for reconfiguring layout of at least one of the multiple workspaces.

17. A computer-readable storage medium of claim 16, wherein reconfiguring the layout further comprises changing a horizontal orientation of the multiple workspaces to a vertical orientation or the vertical orientation of the multiple workspaces to the horizontal orientation.

18. A computer-readable storage medium of claim 16, wherein the user direction comprises receiving input from an input device indicating that the user has resized the at least one workspace; and wherein reconfiguring the layout further comprises changing dimension of the at least one workspace based on the input.

19. A computer-readable storage medium of claim 16, wherein reconfiguring the layout further comprises:
determining that the user is associated with more than one of the multiple workspaces; and
responsive to the determining, merging each workspace associated with the user into a single workspace.

* * * * *